No. 880,685. PATENTED MAR. 3, 1908.
S. S. MONTANYE.
FILTER.
APPLICATION FILED APR. 22, 1907.
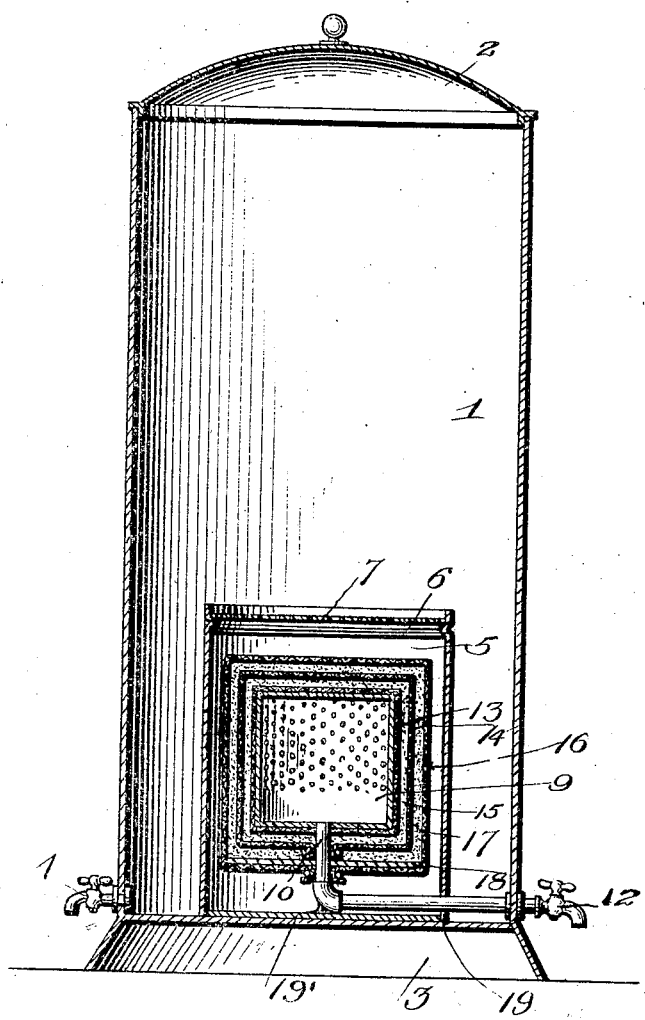
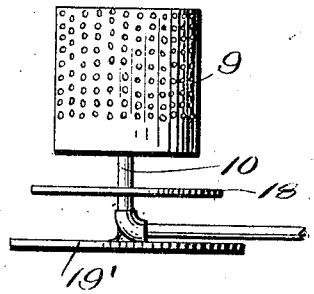
Witnesses
Inventor
S. S. Montanye
by H. B. Willson & Co
Attorneys

UNITED STATES PATENT OFFICE.

STANLEY S. MONTANYE, OF CANTON, PENNSYLVANIA.

FILTER.

No. 880,685.

Specification of Letters Patent.

Patented March 3, 1908.

Application filed April 22, 1907. Serial No. 369,539.

*To all whom it may concern:*

Be it known that I, STANLEY S. MONTANYE, a citizen of the United States, residing at Canton, in the county of Bradford and State of Pennsylvania, have invented certain new and useful Improvements in Filters; and I do declare the following to be a full, clear, and exact description of the invention, such as will enable others skilled in the art to which it appertains to make and use the same.

This invention relates to improvements in water filters.

The object of the invention is to provide a filter adapted to be operated by gravity, and having means whereby the sediment and loose bacteria contained in the water will be caused to settle to the bottom of a filtering chamber instead of penetrating the filtering medium.

A further object is to provide a filter having means whereby the water will be thoroughly sterilized and the germs or disease organisms therein destroyed, said sterilizing means also eliminating all possibility of the growth or culture of any bacteria in the filtered water.

With these objects in view, the invention consists of certain novel features of construction, combination and arrangement of parts as will be more fully described, and particularly pointed out in the appended claims.

In the accompanying drawings, Figure 1 is a vertical sectional view through a filter constructed in accordance with the invention; and Fig. 2 is a detail side view of the inner filtered water receptacle, and the discharge pipe connected thereto removed from the filter.

Referring more particularly to the drawings, 1 denotes the outer cylinder or water receptacle adapted to contain unfiltered water, said casing or receptacle being provided on its upper end with a removable cover, 2, and on its lower end with a flanged base portion, 3. Connected to one side of the casing 1 adjacent to the lower end thereof, is a draw-off faucet, 4.

Arranged in the casing 1 and supported upon the bottom thereof, is a copper sterilizing cylinder, 5, said cylinder being open at its upper and lower ends and provided near its upper end with an annular bead 6, upon which is adapted to rest a removable perforated top, 7. The cylinder 5 is highly polished on its inner and outer sides, thereby greatly facilitating its sterilizing properties.

Arranged in the cylinder 5 is a filtered water receptacle, 9, said receptacle being preferably in the form of a closed metal cylinder, the side walls of which are perforated about three-fourths of the distance down from the upper end of the same, the closed upper end of the receptacle being also perforated as shown. Connected with the bottom of the receptacle 9 is a centrally disposed water discharge pipe 10 which is provided a suitable distance below the receptacle with an elbow or bend, and extends therefrom horizontally through the wall of the casing 1, said projecting end of the pipe being threaded to receive a faucet 12. The ends of the pipe 10 and the faucet 12 are provided with annular flanges or washers, by means of which a water-tight engagement is provided between said parts and the wall of the filter.

The receptacle 9 is covered by a brass cloth screen, 13, over which is arranged a bag-like screen, 14, which is preferably constructed of asbestos cloth, and between said asbestos cloth screen and the brass cloth screen, 12, is arranged a covering of fine filtering material, which is preferably in the form of mineral charcoal, 15. The lower ends of the asbestos cloth screen, 14, are brought around beneath the filtered water receptacle, 9, and are secured to the pipe 10 by a copper wire fastener. Over the asbestos screen is arranged a second bag-like screen, 16, which is formed of brass or asbestos cloth, preferably the latter, and between said outer screen and the screen 14 is arranged a cover of filtering material, 17, which is preferably in the form of bone black. The lower edges of the outer screen 16 are brought around beneath the galvanized steel plate or disk, 18, which is secured to the pipe 10 below the receptacle 9 and forms a support for the filtering material, 17. The ends of the screen 16 are secured to the pipe 10 by a copper wire fastener, as shown.

The sterilizing cylinder 5 is provided in its lower edge with a notch or recess, 19, which, when the cylinder is in place, is adapted to engage the horizontal portion of the pipe 10, thus permitting the cylinder to rest firmly on the bottom of the casing, 1. Secured to the elbow or bend of the pipe 10 is a galvanized steel supporting plate or disk, 19′, which is adapted to rest upon the bottom of the casing 1 and forms a firm support for the filtering mechanism.

The water in being filtered, passes through the perforated plate 7 in the upper end of the copper sterilizing cylinder, thus falling upon the filtering mechanism, and in flowing over the latter will tend to wash the loose bacteria and sediment from the outer screen 16 into the bottom of the sterilizing receptacle. It will be understood that the incoming water in flowing over the screen will wash the sediment and loose foreign matter therefrom, and that said matter will gradually settle to the bottom of the filter instead of penetrating the filtering screens and material, whereby said screens and filtering material will be kept clean and their filtering qualities preserved, whereby they will remain effective in operation for a considerably greater period than would be the case should the sediment and foreign matter be forced into or permitted to adhere to the surface of the filtering material.

The entire filtering mechanism may be readily removed for cleaning or other purpose, by unscrewing the faucet 12 and disengaging the end of the pipe 10 from the opening in the casing 1, after which the filtering mechanism may be removed from the casing and readily taken apart.

Having thus fully described my invention, what I claim as new, and desire to secure by Letters-Patent, is:

1. A filter comprising a casing or receptacle for unfiltered water, an inner filtered water receptacle having a perforated upper portion, a discharge pipe connected with said inner receptacle, a faucet removably connected to the outer end of said pipe, a series of filtering screens arranged over said inner filtered water receptacle, layers of filtering material arranged between said screens, and a copper sterilizing cylinder arranged around said filtering mechanism, substantially as described.

2. A filter comprising a casing or receptacle for unfiltered water, an inner filtered water receptacle having a perforated upper portion, a discharge pipe connected with said inner receptacle, a faucet removably connected to the outer end of said pipe, a series of filtering screens arranged over said inner filtered water receptacle, layers of filtering material arranged between said screens, a copper sterilizing cylinder arranged around said filtering mechanism, said cylinder having polished inner and outer walls, and a perforated top removably supported in the upper end of said cylinder, substantially as described.

3. A water filter comprising an outer casing or receptacle for unfiltered water, a draw-off faucet arranged near the lower end of said casing, a filtering mechanism arranged in said casing, a draw-off pipe connected to said filtering mechanism, and a sterilizing cylinder arranged around said filtering mechanism, substantially as described.

4. A water filter comprising an outer casing or receptacle for unfiltered water, an inner filtered water receptacle having a perforated upper portion, a draw-off pipe connected to said inner receptacle and adapted to form a support for the same, a brass cloth screen arranged around said inner water receptacle, a layer of mineral charcoal filtering material arranged over said brass cloth screen, a bag-like asbestos screen arranged over said filtering material and secured at its lower end to the discharge pipe beneath said filtered water receptacle, a layer of bone black filtering material arranged over said asbestos screen, a galvanized supporting disk arranged on said discharge pipe to support the filtering material, an outer bag-like asbestos screen arranged over said outer layer of filtering material and secured at its lower open end to said discharge pipe below said galvanized plate, a polished copper sterilizing cylinder arranged around said filtering mechanism, a perforated top removably arranged in the upper end of said cylinder, and a supporting disk secured to said discharge pipe to support said filtering mechanism, substantially as described.

In testimony whereof I have hereunto set my hand in presence of two subscribing witnesses.

STANLEY S. MONTANYE.

Witnesses:
  W. C. SECHRIST.
  F. S. HICKOK.